July 21, 1964
R. O. DONOVAN
3,142,050
PHOTOELECTRIC SCANNING COMPASS MONITORING
SYSTEM FOR REMOTELY INDICATING DIRECTION
Filed April 22, 1963
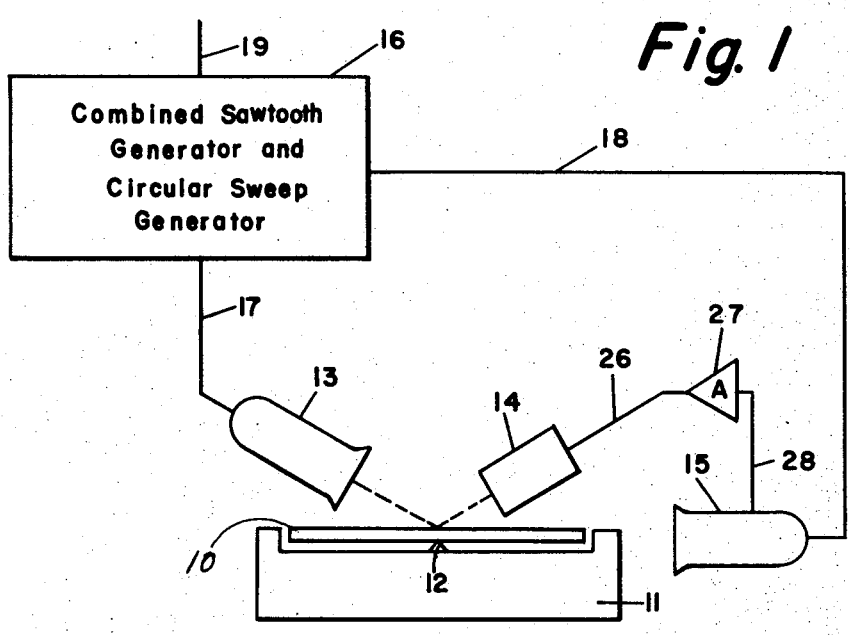
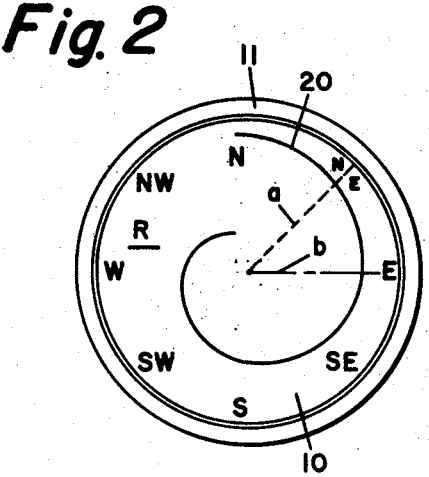
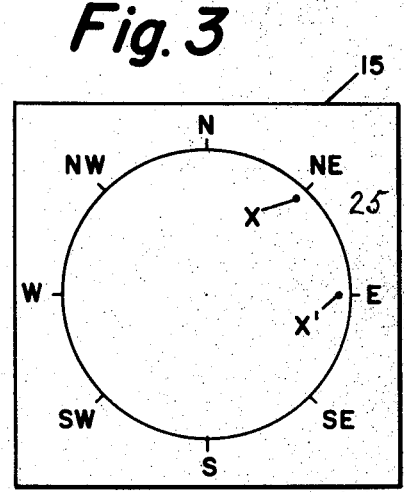
INVENTOR.
ROBERT O. DONOVAN
BY
*J. F. Sheehan*
ATTORNEY United States Patent Office 3,142,050
Patented July 21, 1964

3,142,050
PHOTOELECTRIC SCANNING COMPASS MONITORING SYSTEM FOR REMOTELY INDICATING DIRECTION
Robert O. Donovan, 3700 Wendy Lane, Silver Spring, Md.
Filed Apr. 22, 1963, Ser. No. 274,879
3 Claims. (Cl. 340—212)
(Granted under Title 35, U.S. Code (1952), sec. 266)

The invention described herein may be manufactured and used by or for the Government of the United States of America for governmental purposes without the payment of any royalties thereon or therefor.

This invention relates to an apparatus or system for indicating a ship's bearing and in particular is concerned with an arrangement for indicating the ship's bearing at areas which are remote from the compass equipment which forms a part of the steering mechanism of the ship.

Various systems are known for transmitting information from a ship's compass and remotely indicating the information at selected areas of the ship, but these systems present problems due to loading of the compass structure which result in inefficient operation of the compass or in giving inaccurate information.

The compass card, which is part of the compass equipment, is mounted in generally horizontal position for free movement and the present invention requires that the upper or exposed face of the card be modified by the provision of a spiral line encompassing 360° and generated from the center of the card. The spiral line begins and ends on a diameter from a reference point on the card and cooperating electrical and optical equipment is positioned above the card and relatively arranged so that any deviation or change in the ship's bearing will be made observable on one or more visual displays. The displays are marked in a manner corresponding to the usual compass card markings for providing a remote indication of the ship's bearing in selected remote areas of the ship.

In order to provide the remote indications, the compass card is scanned by a linear light beam from a first cathode ray tube which is mounted above the card and a photoelectric tube which is also mounted above the card and positioned relative to the first cathode ray tube so as to receive light reflected from the compass card. The light beam is periodically moved radially across the card and the photoelectric tube will be operative to indicate when the beam crosses the spiral line.

The principal object of the invention is to provide an apparatus or system for indicating remotely the ship's compass bearing in a manner which does not interfere with the compass operation.

Another object of the invention is to linearly scan a compass card having a design thereon which permits remote indication by other scanning equipment of the ship's bearing shown on the compass card.

Another object is to linearly scan a compass card having a 360° spiral light absorbent line thereon which permits the ship's bearing shown on the compass card to be remotely indicated by a circular scanning display.

Other objects, advantages and novel features of the invention will become apparent from the following detailed description of the invention when considered in conjunction with the accompanying drawings, wherein:

FIG. 1 is a circuit diagram of the apparatus or system showing the position of certain of the elements relative to a ship's compass card;

FIG. 2 is a plan view of the compass card and compass structure of FIG. 1;

FIG. 3 is an enlarged view of the display portion of FIG. 1 which is modified to provide readily discernible visual indication.

Referring to FIG. 1, the compass card is indicated at 10 and is suitably mounted in compass structure shown generally at 11, on a pivot 12 to permit its free movement. The card is provided with reference indicia which may be shown in degrees but as indicated is shown as points of a compass. A first cathode ray tube which is indicated at 13 and also a photoelectric tube which is indicated at 14 are positioned above the compass card at identical angles to the compass card and in opposed relation. The tubes 13 and 14 will be suitably mounted on the ship's structure and will move with the ship relative to the card as the course of the ship is changed. No explanation of the details of the structure of tubes 13 and 14 is necessary for the purpose of this invention since the tubes will be selected according to their functions. The function of cathode ray tube 13 is to periodically transmit or move a light beam radially across the card 10 while the photoelectric tube 14 operates to develop pulses which are used to actuate the remote indicator or display.

The first cathode ray tube 13 is operated by a saw tooth generator and the display devices, one of which is shown at 15 in FIG. 1, is a second cathode ray tube but is operated by a circular sweep generator. These generators are required to be operated in synchronism, for example at 60 c.p.s., and are not shown in detail but are indicated at 16 which represents a unit containing both a saw tooth and a circular sweep generator. The saw tooth sweep is directed to the cathode ray tube 13 by line 17 while the circular sweep is directed to the display device 15 by line 18 and power is supplied to the unit 16 by a line 19.

Referring to FIG. 2, the compass card 10 is provided with a reflective surface R on its upper face and the reflective surface is modified by the provision of a spiral light absorbent line embracing 360° which may be formed as a black stripe 20. The stripe 20 begins and ends on a diameter from the reference indicia N on the card 10 and is developed about the center of the card. Preferably, for greater accuracy, the stripe 20 has its outer end positioned near the outer edge of the card and spirals inwardly to position its inner end near the center of the card as shown in FIG. 2 and thus provides a stripe of substantial length but the stripe may be made to embrace a lesser area, if desired.

FIG. 3 shows the face of the cathode ray tube display 15 having the front 25 of its housing or cabinet structure marked with compass indicia in a manner corresponding to that of the compass card 10.

Referring again to FIG. 1, a line 26 connects an amplifier 27 to the photoelectric tube 14 and signal pulses from the photoelectric tube are amplified and transmitted to the display tube 15 by line 28. In operating the apparatus, the first cathode tube 13 moves a beam of light radially across the card 10 at a desired linear rate, for example, from the center of the card to its outer edge as indicated by the broken radial lines $a$ and $b$ in FIG. 2 which are shown as representative of the various positions the light beam may take as the ship changes course. As the light is reflected from the card, the photoelectric tube 14 is actuated to emit electrons but as the beam crosses the spiral line the light reflection is interrupted causing a pulse to be developed by the tube 14 which is amplified and appears on the tube 15 as a brightness spot. It will be understood that the beam's radial path will vary with changes in the ship's course and will accordingly cross the spiral line 20 at a different point as the ship changes course. Consequently, since the scanning generators are operated in synchronism, and a pulse is produced as the light beam crosses the spiral stripe 20, the brightness spot will appear on the display 15 in a circle from which can be visually determined in a remote area the bearing as it appears on the compass card. The brightness spots are indicated at X and X' in FIG. 3 to represent the points at which the bright beam represented at *a* and *b* in FIG. 2 crosses the spiral line 20.

It will also be appreciated that the stripe 20 may be made reflective while the main surface of the card is light absorbent and the photoelectric tube 14 set to be operative by the light reflection for making the indications on the display 15.

This application is a continuation-in-part of my co-pending application Ser. No. 128,267, filed July 31, 1961, for Photoelectric System for Remote Indication, and now abandoned.

Obviously many modifications and variations of the present invention are possible in the light of the above teachings. It is therefore to be understood that within the scope of the appended claims the invention may be practiced otherwise than as specifically described.

I claim:

1. Apparatus for indicating the bearing of a ship in an area remote from the location of the ship's compass which comprises
   (a) a movable compass card for the ship's compass having a spiral stripe on its upper face and in contrast with said upper face,
   (b) said spiral stripe extending about the geometric center of the card and encompassing 360 degrees,
   (c) linear scanning means for repetitively sweeping a light beam across the face of said compass card in a radial path defined by the geometric center and an edge of the compass card,
   (d) photoelectric pickup means to detect any change in light reflected from the face of said card and to produce a signal at an output in response to said change,
   (e) said linear scanning means being positioned at an angle to the face of said compass card,
   (f) said photoelectric pickup means being positioned in opposed relation to said linear scanning means and at the same angle to the face of said compass card,
   (g) a visual display device including a display surface, a circular scanning means for repetitively defining a circular path on said display surface, and illuminating means responsive to a signal for illuminating a portion of said defined path,
   (h) means connecting the output of said photoelectric pickup means to said display device illuminating means,
   (i) and means connected to said linear and to said circular scanning means for operating both said scanning means in synchronism.

2. Apparatus as in claim 1, further characterized by said compass card and said visual display device having corresponding reference scales.

3. Apparatus as in claim 1, further characterized by the said visual display device including a cathode ray tube having its tube face portion forming said display surface and a reference scale in the form of compass indicia surrounding said tube face.

References Cited in the file of this patent

UNITED STATES PATENTS

| | | |
|---|---|---|
| 2,491,591 | Sweeny et al. | Dec. 20, 1949 |
| 2,538,065 | Wallace | Jan. 16, 1951 |
| 2,933,246 | Rabinow | Apr. 19, 1960 |
| 2,989,642 | Svec | June 20, 1961 |